(12) United States Patent
Kessler et al.

(10) Patent No.: US 9,783,009 B2
(45) Date of Patent: Oct. 10, 2017

(54) SELF-ADAPTIVE METHOD FOR ASSISTING TIRE INFLATION

(71) Applicants: CONTINENTAL AUTOMOTIVE FRANCE, Toulouse (FR); CONTINENTAL AUTOMOTIVE GMBH, Hannover (DE)

(72) Inventors: Sebastien Kessler, Dremil-Lafage (FR); Jerome Lee, Toulouse (FR); Sebastien De Villardi, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 53 days.

(21) Appl. No.: 14/765,363

(22) PCT Filed: Feb. 25, 2014

(86) PCT No.: PCT/EP2014/000489
§ 371 (c)(1),
(2) Date: Aug. 3, 2015

(87) PCT Pub. No.: WO2014/131509
PCT Pub. Date: Sep. 4, 2014

(65) Prior Publication Data
US 2016/0001614 A1    Jan. 7, 2016

(30) Foreign Application Priority Data
Feb. 28, 2013    (FR) ...................................... 13 51805

(51) Int. Cl.
*G06F 19/00*    (2011.01)
*B60C 23/04*    (2006.01)

(52) U.S. Cl.
CPC ...... *B60C 23/0408* (2013.01); *B60C 23/0437* (2013.01); *B60C 23/0455* (2013.01);
(Continued)

(58) Field of Classification Search
USPC ......................................................... 701/34.4
See application file for complete search history.

(56) References Cited

U.S. PATENT DOCUMENTS 6,438,193 B1 *   8/2002   Ko ...................... B60C 23/0408
                                                    377/15
6,469,621 B1 *  10/2002   Vredevoogd ....... B60C 23/0408
                                                    340/442

(Continued)

FOREIGN PATENT DOCUMENTS

DE    102010062058    5/2012
DE    102011008881    7/2012

(Continued)

OTHER PUBLICATIONS

International Search Report, dated Apr. 9, 2014, from corresponding PCT application.

*Primary Examiner* — Ronnie Mancho
(74) *Attorney, Agent, or Firm* — Young & Thompson

(57) ABSTRACT

A self-adaptive method for assisting tire inflation enables control of tire inflation. If the vehicle stops, the central unit of a TPMS (Tire Pressure Monitoring System) can change in a self-adaptive manner from the reception configuration of the "moving" mode at a high bit rate to a "stationary" mode at a low bit rate. At the same time, if there is a variation in the pressure of a tire, the corresponding wheel unit is set for transmission in "stationary" mode at a low bit rate. The power Pa received at the central unit varies according to a curve (20) which shows, in the illustrated example, two positions of poor reception. By replacing high bit rate transmission with low bit rate transmission, the signal/noise (Continued)

Figure 1:
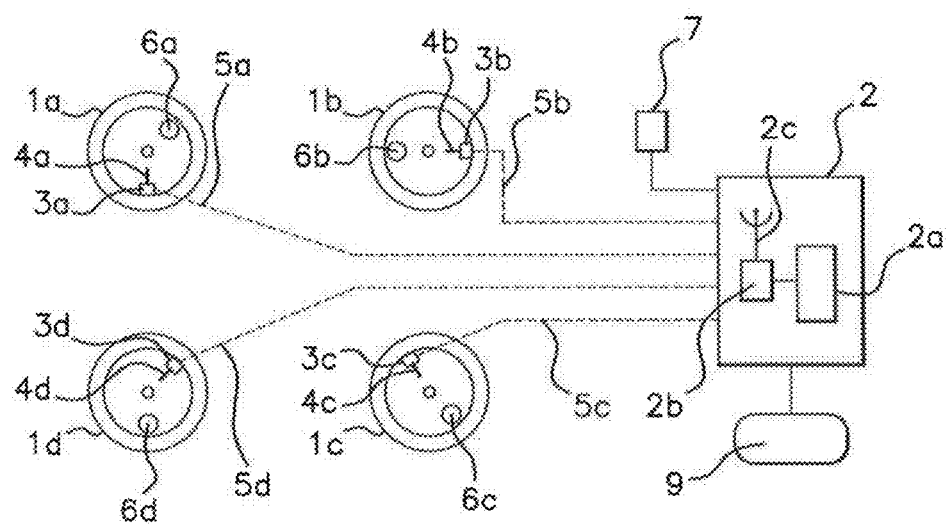

ratio is improved and there is a gain in reception sensitivity of about 5 dB, and the risks of disturbance of the received power are virtually eliminated.

20 Claims, 3 Drawing Sheets

(52) U.S. Cl.
CPC ...... *B60C 23/0459* (2013.01); *B60C 23/0462* (2013.01); *B60C 23/0484* (2013.01)

(56) References Cited

U.S. PATENT DOCUMENTS

| | | | | |
|---|---|---|---|---|
| 6,922,134 B1* | 7/2005 | Yones | ................ | B60C 23/0408 340/10.51 |
| 6,995,672 B1* | 2/2006 | Yones | ................ | B60C 23/0433 340/442 |
| 7,260,371 B1* | 8/2007 | Yones | ................... | H04W 52/42 340/10.1 |
| 8,742,914 B2* | 6/2014 | Deniau | ............... | B60C 23/0455 340/442 |
| 8,751,092 B2* | 6/2014 | Deniau | ............... | B60C 23/0418 340/442 |
| 9,517,664 B2* | 12/2016 | McIntyre | ................ | H04L 43/18 |
| 2001/0004236 A1* | 6/2001 | Letkomiller | ........ | B60C 23/0408 340/572.1 |
| 2007/0008097 A1 | 1/2007 | Mori et al. | | |
| 2012/0166836 A1* | 6/2012 | Hardman | ............ | B60C 23/0433 713/320 |
| 2012/0259511 A1 | 10/2012 | Kuchler et al. | | |
| 2014/0073260 A1 | 3/2014 | Bettecken | | |

FOREIGN PATENT DOCUMENTS

| | | |
|---|---|---|
| EP | 1674299 | 6/2006 |
| EP | 2829425 | 1/2015 |
| WO | 2011073072 | 6/2011 |

* cited by examiner

SELF-ADAPTIVE METHOD FOR ASSISTING TIRE INFLATION

The present invention relates to a self-adaptive method for assisting tire inflation, enabling the control of tire inflation to be improved by providing a better connection between a tire and the equipment monitoring it.

In its principal application, the invention relates to systems installed in motor vehicles for monitoring and controlling tire pressure, these systems being known as TPMS systems (from the initials of the English term Tire Pressure Monitoring System).

Since tire pressure monitoring is essential for the safety of motor vehicles, pressure monitoring systems such as TPMS systems have been devised to provide this function and have been installed in motor vehicles. They mainly comprise sensors which measure the pressures of the tires and transfer these pressures to a central unit. This central unit collects and analyzes the tire pressure data, using wireless links. The result of these analyses is generally displayed on the dashboard of the vehicle. This system can therefore inform the driver of the tire pressure in real time, or simply produce a visual or audible announcement if any pressure anomalies are detected by this system.

Various improvements have been made to this type of system. At the tires, the pressure sensor and its wireless communication system have been supplemented by other sensors, particularly temperature and acceleration sensors. This group of equipment is referred to hereafter as a "wheel unit" positioned at the tire (from the English term "wheel unit").

In order to overcome certain wireless transmission problems between a wheel unit and the central unit, the solution that has been applied consists in transmitting each frame of information in a repeated manner, so that at least one frame reaches the central unit.

A further example of improvement is known from the patent document EP 2 829 425. This document specifies that there is no need to inform the driver, while he is driving, of small pressure drops which do not require an immediate stop. Indeed, there is a risk that this information will be forgotten at the next stop.

This document proposes to communicate this information at the instant when the driver stops. For this purpose, a sensor informs the central unit of the stops of the vehicle, at a service station for example, so that any pressure drops can be communicated only at the time of these stops. However, a sudden and unacceptable pressure drop is indicated to the driver in real time.

On the other hand, the international application WO 2011/073072 provides an improvement consisting in the monitoring of the pressure of one or more tires undergoing inflation by the tire monitoring system, as a supplement to, or in place of, the conventional monitoring provided on the inflation apparatus.

All these monitoring systems are fundamentally designed to measure the tire pressure solely during the movement of the vehicle. Improvements have been made for the purpose of additionally monitoring the pressure during stationary periods, at service stations for example, for monitoring the inflation of the tires.

When the vehicle is stationary, a major problem arises in the form of a risk of poor transmission between the tires and the central analysis unit. This is because, when the wireless links between the pressure sensors of the wheel units encounter obstacles, the level of reception of the signals at the central unit decreases to the point where these signals may become inaudible. The wheel positions which give rise to these reception problems are called "black spots" (in English terminology).

If the vehicle is stopped in black spot conditions, the transmission is affected throughout the duration of the stop. These black spots may appear, for example, as a result of the position of the transmitting antenna of a wheel unit, the ground reflection of some or all of the transmitted signal, or the relative position of the wheel unit with respect to the central unit. Experience has shown that, in the stationary condition, the probability that the vehicle will be in a black spot position is substantial and non-negligible for at least one of its four wheel units.

If a wheel unit is stationary in a black spot, the link budget for its link to the central unit is severely degraded, to −90 dBm or thereabouts. In this case, the message received by the central unit can no longer be analyzed, because the signal/noise ratio is too low.

None of the improvements made to the methods for assisting tire inflation makes allowance for this problem of stopping on a black spot.

The invention proposes to overcome this black spot problem by improving the link budget between the wheel units and the central unit while the vehicle is stationary. For this purpose, the bit rate of this link is reduced in this condition, providing a better signal/noise ratio and therefore greater sensitivity, and thus minimizing the risks of perturbation due to black spots.

More precisely, the present invention proposes a self-adaptive method for assisting the inflation of vehicle tires, consisting in the continuous measurement of at least the pressure of each tire by a wheel unit, and the transmission of the messages on the state of the tires via a wireless link between each wheel unit and the central unit at not less than two different bit rates, called the high bit rate and the low bit rate. The central unit then analyzes these messages continuously, and then transmits information about the state of the tires to an information module. A continuous measurement of the state of movement or immobility of the vehicle is also supplied to the central unit and to the wheel unit. In this method, the messages are transmitted, when the vehicle stops, at a sufficiently low bit rate to ensure that the reception sensitivity of the central unit can avoid practically all disturbance in reception.

Thus, if reception is disturbed by a black spot, the signal level received by the central unit may, for example, be as low as −90 dBm or less. By replacing high bit rate transmission with low bit rate transmission, the signal/noise ratio is improved and there is a gain in reception sensitivity if the bit rate is reduced from 9.6 kbit/s (a typical value in this field of measurement) to 2 kbit/s, thus allowing the signals to be received.

In these conditions, the inflation assistance function is practically fully available, since the risks of disturbance due to the presence of a black spot are virtually eliminated. Moreover, the method according to the invention can easily be incorporated into existing tire control systems in vehicles.

According to a preferred embodiment, the method according to the invention includes the following steps, for the central unit as well as the wheel units:
  if a stationary state of the vehicle is detected by continuous measurement for longer than a specified duration, the central unit is set to two possible configurations of the reception mode, namely a high bit rate "moving" mode and a low bit rate "stationary" mode;
  if, additionally, the pressure variation of a tire exceeds a specified threshold, the corresponding wheel unit is set for transmission in "stationary" mode at a low bit rate, and also in "moving" mode at a high bit rate.

Advantageously, the method for each wheel unit comprises the following steps:

a moving or stationary state of the vehicle is detected by continuous measurement, and if a moving state of the vehicle is detected, the wheel unit is set to "moving" mode and the messages are transmitted at a high bit rate;

if the continuous measurement detects a stationary state of the vehicle, the wheel unit determines whether the tire pressure variation is above a threshold value;

if the pressure variation is below said threshold, the messages are transmitted at a high bit rate;

if the pressure variation is above said threshold, the wheel unit sets itself to "stationary" mode, to transmit messages at a low bit rate while the vehicle remains stationary for longer than a first specified duration, for example while the vehicle is stopped for inflation. In this case, the messages are of the "stationary" type;

if the stop is prolonged beyond said first specified duration, for example if the vehicle is in a prolonged stationary or parked state, the method returns to the initial state at the wheel unit.

The method may advantageously include the following steps, if the wheel unit has started to transmit at a low bit rate:

this wheel unit continues to transmit at a low bit rate while the vehicle remains stationary, and while the pressure variation, measured by a pressure test, is above a pressure threshold, corresponding for example to stopping in a parking area in an inflation situation;

if the pressure variation measured by this pressure test is below this threshold, corresponding for example to a situation at the end of inflation, the method remains in "stationary" mode until the expiry of said first duration;

if a moving state of the vehicle is detected, the wheel unit sets itself to "moving" mode, and the messages are transmitted at a high bit rate.

According to advantageous embodiments:

in "stationary" mode, it is also possible for the wheel unit to transmit messages at a high bit rate;

in "moving" mode, it is also possible for the wheel unit not to transmit any message.

The method may also advantageously include the following steps for the central unit:

a moving or stationary state of the vehicle is detected by continuous measurement, and if a moving state of the vehicle is detected, the messages are received at a high bit rate;

if the continuous measurement detects a stationary state of the vehicle for more than a second predetermined duration, the central unit is set to "stationary" reception mode at a low bit rate, for example when the vehicle is stopped at a service station or during long-term parking;

if said second specified duration has not expired, but a tire pressure variation above a specified threshold is detected, the central unit is set to "stationary" reception mode at a low bit rate, particularly when the vehicle is stopped for the inflation of the tire;

if the pressure variation remains below said predetermined value, the central unit remains set to "moving" reception mode at a high bit rate;

in "stationary" mode, the central unit may also receive messages at a high bit rate;

in "moving" mode, the central unit may also receive messages at a low bit rate.

According to other preferred embodiments:

the first and second durations may be equal or different for the central unit and for each wheel unit;

these durations may be defined according to the driver profile determined on the basis of recorded profiles;

the wireless links are provided in a radio frequency band;

the low bit rate is chosen according to a compromise between the desired sensitivity and the duration of the messages to be transmitted;

the messages transmitted at a low bit rate are limited to essential information, and therefore contain less information than the messages transmitted at a high bit rate, in particular the wheel unit identification and the pressure measurement of the corresponding tire; this has the advantage of maintaining an equivalent duration for messages at high and low bit rates, thereby complying with the current national regulations;

the messages are transmitted to the vehicle driver in real time, or may be delayed until the next stop of the vehicle in the case of messages corresponding to minor pressure drops;

the method for assisting tire inflation is integrated into a tire control system of the TPMS type, comprising the central unit and the wheel units defined above, together with movement sensors on each wheel and at the central unit, so that the system can operate according to this method.

Figure 2:
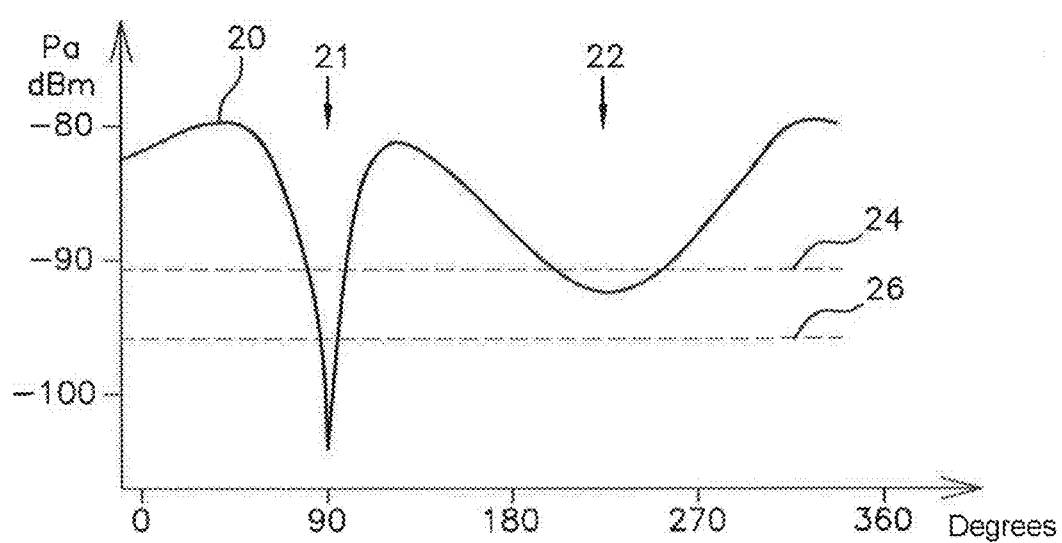
Figure 3:
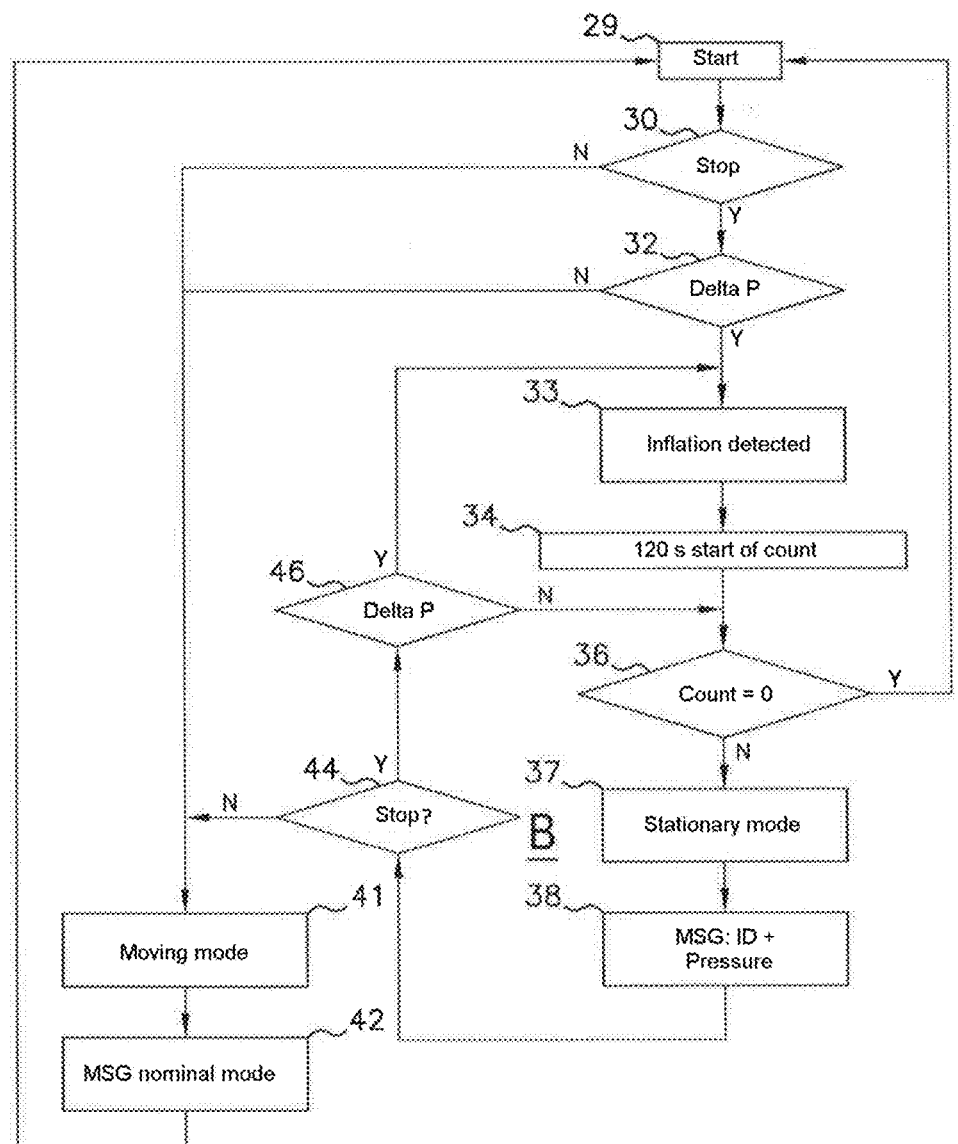
Figure 4:
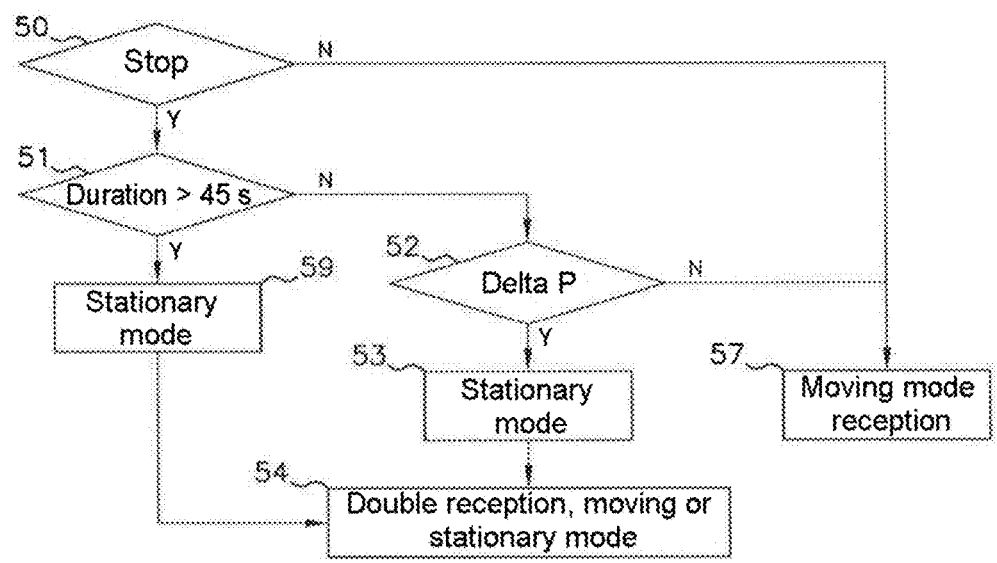

Other data, characteristics and advantages of the present invention will become apparent in the light of the following non-limiting description, referring to the attached drawings, which show, respectively:

in FIG. 1, a schematic diagram of an example of a tire control system of a vehicle suitable for the application of the method according to the invention;

in FIG. 2, a diagram of an example of power received by the central unit of the system according to FIG. 1, as a function of the rotation of a tire;

in FIG. 3, a flow diagram showing the steps of an exemplary embodiment of the method according to the invention for a wheel unit, and in FIG. 4, a flow diagram showing the steps of an exemplary method according to the invention for the central unit.

With reference to the schematic diagram of FIG. 1, the four tires 1a to 1d of a motor vehicle (not shown) are each fitted with a wheel unit 3a to 3d. These wheel units 3a to 3d comprise antennae 4a to 4d which transmit signals carried by radio-frequency links 5a to 5d to a central unit 2. Each of the four tires 1a to 1d also has a movement sensor 6a to 6d. Each of these sensors 6a to 6d periodically transmits the information on the stoppage or movement of the respective wheel unit 3a to 3d to the central unit 2, by means of a wireless link (not shown). A central movement sensor 7 is electrically connected to the central unit 2. It is used for informing the central unit 2 of the stationary or moving situation of the vehicle, and communicates its own measurement to this unit. The complete status of the vehicle in respect of movement or stoppage is thus available to the central unit 2 from the set of movement sensors 7, 6a to 6d.

The central unit 2 is intended to continuously analyze the information supplied by the wheel units 3a to 3d and by the movement sensors 7, 6a to 6d, this information being the pressure, temperature, acceleration and "moving or stationary" state in the illustrated example. The central unit 2 has at least the following elements: a microcontroller 2a, a receiver 2b and an antenna 2c. This central unit 2 thus receives the signals sent from the wheel units 3a to 3d, the respective power of which varies as a function of the position of the antennae 4a to 4d, the environment of the wheel units 3a to 3d, and the central unit 2 (ground reflections, engine, vehicle equipment, and the like). These variations may result in low levels of reception by the central unit 2.

After analyzing the received information, the central unit 2 displays relevant information for the driver on a display module 9, particularly an immediate warning in case of a severe pressure drop for at least one tire, and, for minor pressure drops, of less than 0.1-0.2 bar for example, a warning communicated only on the next stop of the vehicle.

The diagram of FIG. 2 shows the variation of the power Pa of the signal received by the central unit 2, this signal having been sent from the antenna 4a of the wheel unit 3a, as a function of the rotation angle for a complete revolution of the wheel, namely 360° for the tire 1 a (see FIG. 1). The power Pa varies according to a curve 20 which shows, in the illustrated example, two positions of poor reception, 21 and 22, called black spots, where the angle of rotation reaches approximately 90°, and in the range from 200° to 250°.

The black spot 21 is narrow and deep. The risk of its occurrence is low because of its narrowness. The black spot 22 is wide and shallow, so the risk of its occurrence is substantially greater. The power level Pa received at the black spot 21 falls to about −100 dBm, and to about −90 dBm in the case of the black spot 22.

When the vehicle is stopped, the method according to the invention replaces the conventionally used transmission at a high bit rate of 9.6 kbit/s with transmission at a low bit rate of 2 kbit/s, in the illustrated example. The use of this low bit rate then results in a better signal/noise ratio and consequently a gain in sensitivity. In this case, the gain is approximately 5 dB in reception. Thus the sensitivity level of the central unit changes from −91 dBm (level 24) for the high bit rate to −96 dBm (level 26) for the low bit rate. In these conditions, the black spot angular interval is greatly reduced for the black spot 21 and disappears for the black spot 22.

FIG. 3 details more precisely, in an exemplary flow diagram, the steps of the method according to the invention applied to a wheel unit in order to achieve the improved sensitivity at the central unit as described above. This flow diagram comprises the following steps.

After the start ("Start", 29) of this method, a first test 30 on the moving/stationary state of the vehicle is performed by a continuous measurement provided by a movement sensor 6a of a wheel unit. When a moving state of the vehicle is detected, the wheel unit is set to the high bit rate mode, also called the "moving" mode, in its nominal state (step 41); periodic messages, digitized in this case, are then transmitted in this mode (step 42), after which the method returns to "Start", 29.

If the result of the test 30 indicates a stationary state of the vehicle (the answer "Yes"), a first test 32 is performed on the pressure variation ΔP of the tire of the wheel unit relative to a specified threshold value, equal to 0.1 bar in this case, in order to detect inflation of the tire at a service station.

If the test 32 is positive, the wheel unit concludes (step 33) that the vehicle is located in a service station for the inflation of the tire corresponding to the wheel unit.

After the conclusion of step 33, a count of the duration is initialized (step 34), starting from a duration of 120 seconds in this example. The test 36 is carried out to ascertain whether the countdown of step 34 has reached zero.

Thus, while the expired duration is less than the reference value, 120 s in the example, the wheel unit switches its setting to the low bit rate mode (step 37), also called the "stationary" mode, for transmitting short messages containing only its identity and the pressure information (step 38); optionally, the wheel unit may also transmit frames at a high bit rate to provide security of transmission by redundancy.

These low bit rate messages are shorter in terms of the number of bits, so that their maximum duration is equal to that of the high bit rate messages in "moving" mode, to ensure that the duration of the low bit rate messages also complies with the official standardization regulations. For this purpose, these messages comprise a limited number of information elements, containing only the identity of the wheel unit and the pressure value in this example. The advantage of using this low bit rate is that the link budget is improved if a stop is made on a black spot.

The stationary mode (step 38) continues while the method follows a loop B comprising the following steps: the vehicle being stationary (test 44 to determine whether the vehicle has stopped), the pressure variation ΔP of the tire of the wheel unit is below the specified threshold value (test 46, with—in the example—the same threshold value as for the pressure test 32), and the countdown has not yet reached zero (test 36). This loop corresponds, for example, to a stationary situation at an inflation station at the end of the process of inflating a tire.

From the instant at which the reference duration of test 36 is reached (when the answer "Yes" is given to this test), the method concludes that the inflation process has ended, and the wheel unit returns to the "start" (step 29) of this method. This corresponds to a first possible exit from the loop B.

A second possible exit from this loop B corresponds to the end of the stationary state of the vehicle (the stopping test 44). If the answer "no" is given to the stopping test 44, the wheel unit changes to "moving" mode (step 41), after which the method follows the steps described above, starting from this step 41.

Another possible exit from this loop B is the detection (pressure test 46) of a pressure variation ΔP (equal to 0.1 bar in this case) in the tire of the wheel unit relative to a specified threshold value. If the answer to this test 46 is "Yes", the wheel unit concludes (step 33) that the vehicle is located in a service station for the inflation of the tire corresponding to the wheel unit. The method then follows the steps described above, starting from step 33.

The wheel units of the vehicle, generally four in number, each follow the method described in this FIG. 3. These wheel units do not necessarily switch from "moving" mode to "stationary" mode at the same time, and the operation of the central unit (described in the next section) enables messages in the nominal mode (at a high bit rate) and messages in the stationary mode (at a low bit rate) to be received simultaneously.

To illustrate the activity at the central unit in the method according to the invention, FIG. 4 shows a flow diagram of the steps of an exemplary embodiment. This flow diagram comprises the following steps:

a first test 50 is performed on the state of the vehicle, in the same way as the test 30 performed at the wheel unit, to determine whether the vehicle is moving or stationary;

if the vehicle is moving (answer "No"), the central unit receives (step 57) messages in "moving" mode at a high bit rate;

if the vehicle is stationary (answer "Yes"), a new duration countdown test 51 is performed with respect to a reference duration of 45 seconds in the example;

as long as the expired duration is less than 45 seconds (answer "No"), a new pressure variation detection test 52 is performed to determine whether a tire is being inflated;

if the pressure variation detected in test 52 remains below (answer "No" to the test) a predetermined threshold of 0.1 bar, the central unit receives (step 57) messages at a high bit rate;

if the pressure variation detected in test 52 becomes greater (answer "Yes" to the test) than the predetermined threshold, the central unit concludes that the vehicle has stopped at an inflation station, and switches (step 53) to "stationary" mode to receive (step 54) data at a low bit rate, while continuing to maintain a high bit rate reception mode for other applications.

if the measured duration exceeds the reference duration of 45 s (test 51), the central unit concludes that the vehicle has stopped at a station for inflating the tire (step 59), and switches to "stationary" reception mode to receive the information at a low bit rate, while continuing to maintain a high bit rate reception mode for other applications (step 54). Optionally, if the wheel unit transmits information at a high bit rate, the central unit is also configured in "moving" mode for receiving this information.

The invention is not limited to the exemplary embodiments described and represented. Thus, different values of low bit rate may be chosen for different cases of the "stationary" mode used in this method, namely a situation of stopping with tire inflation, or a simple parking situation.

This method could be integrated into a more complete method incorporating all aspects of the existing systems relating to the technical control of tires. By way of example, the time when the information is supplied to the driver may be adapted according to the importance or otherwise of the loss of pressure in a tire.

Furthermore, the technique of sending each frame of information in a repeated manner (known as a "time diversity" technique in the English terminology) may also be added to the method according to the invention.

The invention claimed is:

1. A self-adaptive method for assisting inflation of the tires of a vehicle, comprising continuously measuring at least the pressure of each tire by means of a wheel unit, transmitting messages, at a high bit rate, on a state of the tires via a wireless link between each wheel unit and a central unit, the central unit analyzing these messages continuously, and then transmitting information relating to the state of the tires to an information module, and continuously measuring a moving/stationary state of the vehicle in order to inform the central unit and the wheel unit of this state, wherein the messages are transmitted, when the vehicle is stationary, at a sufficiently low bit rate to provide an improved signal-to-noise ratio to enable the reception sensitivity of the central unit to avoid virtually any disturbance in reception.

2. The self-adaptive method as claimed in claim 1, wherein, if a stationary state of the vehicle is detected by continuous measurement for more than a specified duration, the central unit is set to two possible configurations of the reception mode, namely a high bit rate "moving" mode and a low bit rate "stationary" mode, and if, additionally, a pressure variation of a tire is above a specified threshold, the corresponding wheel unit is set for transmission in "stationary" mode at a low bit rate, and, additionally, in "moving" mode at a high bit rate.

3. The self-adaptive method as claimed in claim 1, wherein the corresponding wheel unit is also set to "moving" mode at a high bit rate.

4. The self-adaptive method as claimed in claim 1, wherein the following steps are executed at each wheel unit:

a moving or stationary state of the vehicle is detected by continuous measurement, and if a moving state of the vehicle is detected, the wheel unit sets itself to "moving" mode and the messages are transmitted at a high bit rate;

if the continuous measurement detects a stationary state of the vehicle, the wheel unit determines whether the pressure variation of the tire is above a threshold value;

if the pressure variation is below said threshold, the messages are transmitted at a high bit rate;

if the pressure variation is above said threshold, the wheel unit sets itself to "stationary" mode, to transmit messages at a low bit rate in this mode while the vehicle remains stationary for longer than a first specified duration.

if the stop is prolonged beyond said first specified duration, the method returns to an initial state at the wheel unit.

5. The self-adaptive method as claimed in claim 4, wherein the following steps are executed for the wheel unit, when it is in "stationary" mode:

the wheel unit continues to transmit at a low bit rate while the vehicle remains stationary and while the pressure variation, measured by a pressure test, is above a pressure threshold;

if the pressure variation measured by this pressure test is below this threshold, the method remains in "stationary" mode until the expiry of said first duration;

if a moving state of the vehicle is detected, the wheel unit sets itself to "moving" mode, and the messages are transmitted at a high bit rate.

6. The self-adaptive method as claimed in claim 4, wherein the wheel unit, in "stationary" mode, also transmits messages at a high bit rate.

7. The self-adaptive method as claimed in claim 4, wherein the wheel unit, in "moving" mode, does not transmit any message.

8. The self-adaptive method as claimed in claim 5, wherein the following steps are executed at the central unit:

a moving or stationary state of the vehicle is detected by continuous measurement, and if a moving state of the vehicle is detected, the messages are received at a high bit rate;

if the continuous measurement detects a stationary state of the vehicle for longer than a second predetermined duration, the central unit is set to "stationary" reception mode at a low bit rate;

if said second specified duration has not expired, but a pressure variation of the tire is above a specified threshold, the central unit is set to "stationary" reception mode at a low bit rate;

if the pressure variation remains below said predetermined value, the central unit remains set to "moving" reception mode at a high bit rate.

9. The self-adaptive method as claimed in claim 8, wherein the central unit, in "stationary" mode, also receives messages at a high bit rate.

10. The self-adaptive method as claimed in claim 8, wherein the central unit, in "moving" mode, also receives messages at a low bit rate.

11. The self-adaptive method as claimed in claim 8, wherein the first and second durations may be different for the central unit and for each wheel unit.

12. The self-adaptive method as claimed in claim 1, wherein the low bit rate is chosen according to a compromise between the desired sensitivity and the duration of the messages to be transmitted.

13. The self-adaptive method as claimed in claim 1, wherein the messages transmitted at a low bit rate are limited to information concerning the identification of a wheel unit and the measurement of the pressure of the corresponding tire.

14. The self-adaptive method as claimed in claim 2, wherein the corresponding wheel unit is also set to "moving" mode at a high bit rate.

15. The self-adaptive method as claimed in claim 6, wherein the wheel unit, in "stationary" mode, also transmits messages at a high bit rate.

16. The self-adaptive method as claimed in claim 5, wherein the wheel unit, in "moving" mode, does not transmit any message.

17. The self-adaptive method as claimed in claim 1, wherein the following steps are executed at the central unit:

a moving or stationary state of the vehicle is detected by continuous measurement, and if a moving state of the vehicle is detected, the messages are received at a high bit rate;

if the continuous measurement detects a stationary state of the vehicle for longer than a second predetermined duration, the central unit is set to "stationary" reception mode at a low bit rate;

if said second specified duration has not expired, but a pressure variation of the tire is above a specified threshold, the central unit is set to "stationary" reception mode at a low bit rate;

if the pressure variation remains below said predetermined value, the central unit remains set to "moving" reception mode at a high bit rate.

18. The self-adaptive method as claimed in claim 17, wherein the central unit, in "stationary" mode, also receives messages at a high bit rate.

19. The self-adaptive method as claimed in claim 17, wherein the central unit, in "moving" mode, also receives messages at a low bit rate.

20. The self-adaptive method as claimed in claim 18, wherein the central unit, in "moving" mode, also receives messages at a low bit rate.

* * * * *